(12) United States Patent
Liu (10) Patent No.: US 6,384,553 B1
(45) Date of Patent: May 7, 2002

(54) CURRENT CONTROL METHOD AND DEVICE FOR A MOTOR THAT IS OPERABLE IN A GENERATOR MODE

(75) Inventor: Doc Liu, Nan-Tou Hsien (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 09/749,065

(22) Filed: Dec. 27, 2000

(51) Int. Cl.$^7$ ................................................. H02P 1/00
(52) U.S. Cl. ........................ 318/139; 318/254; 318/138; 318/439; 318/376; 318/798
(58) Field of Search ................................ 318/139, 376, 318/254, 439, 798, 815, 138

(56) References Cited

U.S. PATENT DOCUMENTS

| | | | | |
|---|---|---|---|---|
| 4,908,553 A | * | 3/1990 | Hoppie et al. ............... | 318/376 |
| 5,578,911 A | * | 11/1996 | Carter et al. ................. | 318/254 |
| 5,923,728 A | * | 7/1999 | Ikkai et al. .................. | 318/716 |

* cited by examiner

*Primary Examiner*—Karen Masih
(74) *Attorney, Agent, or Firm*—Ladas & Parry (57) ABSTRACT

A system includes a battery, a motor, a switching circuit that interconnects the battery and the motor, a switch driving circuit that is connected to the switching circuit, and a controller that is connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque. In a method and device for controlling current flow to the motor when the switching circuit is operated in the second mode, the switch driving circuit is controlled so as to adjust duty cycle of control pulses provided by the switch driving circuit to the switching circuit in an inversely proportional relationship with respect to the actual rotational speed or the actual magnitude of back electromotive force waves of the motor, thereby controlling the current flow to the motor to prevent damage to components of the switching circuit.

16 Claims, 7 Drawing Sheets

CURRENT CONTROL METHOD AND DEVICE FOR A MOTOR THAT IS OPERABLE IN A GENERATOR MODE

BACKGROUND OF THE INVENTION

1. Field of the Invention

The invention relates to the field of motor control, more particularly to a current control method and device for a motor that is operable in a generator mode.

2. Description of the Related Art

U.S. Pat. No. 5,519,294 discloses a torque control method and device for a brushless DC motor used in an electric motorcycle. The motor is operable in a first mode, wherein the motor rotates in a positive direction and has a positive torque, and a second mode, wherein the motor also rotates in a positive direction but has a negative torque. In the second mode, the motor can act as a generator for storing energy to a battery.

In the aforesaid patent, the current through the motor in either of the first and second modes is controlled by closing and opening selected ones of a plurality of control switches of a switching circuit. Because the control switches are opened or closed in a continuous manner without taking into account the actual rotational speed or the magnitude of the back electromotive force (back EMF) waves of the motor, there is a tendency that the current flow during operation of the motor in the generator mode will exceed the rated current of the control switches, thereby resulting in damage to the switching circuit.

SUMMARY OF THE INVENTION

Therefore, the object of the present invention is to provide a current control method and device for a motor so as to prevent damage to electrical components during operation of the motor in a generator mode.

According to one aspect of the invention, in a system that includes a battery, a motor, a switching circuit that interconnects the battery and the motor, a switch driving circuit that is connected to the switching circuit, and a controller that is connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque, a method of controlling current flow to the motor when the switching circuit is operated in the second mode, comprises the steps of:

detecting actual rotational speed of the motor; and controlling the switch driving circuit to adjust duty cycle of control pulses provided by the switch driving circuit to the switching circuit in an inversely proportional relationship with respect to the actual rotational speed of the motor, thereby controlling the current flow to the motor to prevent damage to the switching circuit.

According to another aspect of the invention, in a system that includes a battery, a motor, a switching circuit that interconnects the battery and the motor, a switch driving circuit that is connected to the switching circuit, and a controller that is connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque, a method of controlling current flow to the motor when the switching circuit is operated in the second mode, comprises the steps of:

detecting actual magnitude of back electromotive force waves of the motor; and controlling the switch driving circuit to adjust duty cycle of control pulses provided by the switch driving circuit to the switching circuit in an inversely proportional relationship with respect to the actual magnitude of the back electromotive force waves of the motor, thereby controlling the current flow to the motor to prevent damage to the switching circuit.

According to still another aspect of the invention, in a system that includes a battery, a motor, a switching circuit that interconnects the battery and the motor, and a switch driving circuit that is connected to the switching circuit, a device for controlling current flow to the motor comprises:

a controller adapted to be connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque; and a speed sensor connected to the controller and adapted to detect actual rotational speed of the motor;

the controller being adapted to control the switch driving circuit to adjust duty cycle of control pulses provided by the switch driving circuit to the switching circuit in an inversely proportional relationship with respect to the actual rotational speed of the motor when the switching circuit is operated in the second mode, thereby controlling the current flow to the motor to prevent damage to the switching circuit.

According to yet another aspect of this invention, in a system that includes a battery, a motor, a switching circuit that interconnects the battery and the motor, and a switch driving circuit that is connected to the switching circuit, a device for controlling current flow to the motor comprises:

a controller adapted to be connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque; and a back electromotive force detector connected to the controller and adapted to detect actual magnitude of back electromotive force waves of the motor;

the controller being adapted to control the switch driving circuit to adjust duty cycle of control pulses provided by the switch driving circuit to the switching circuit in an inversely proportional relationship with respect to the actual magnitude of the back electromotive force waves of the motor when the switching circuit is operated in the second mode, thereby controlling the current flow to the motor to prevent damage to the switching circuit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
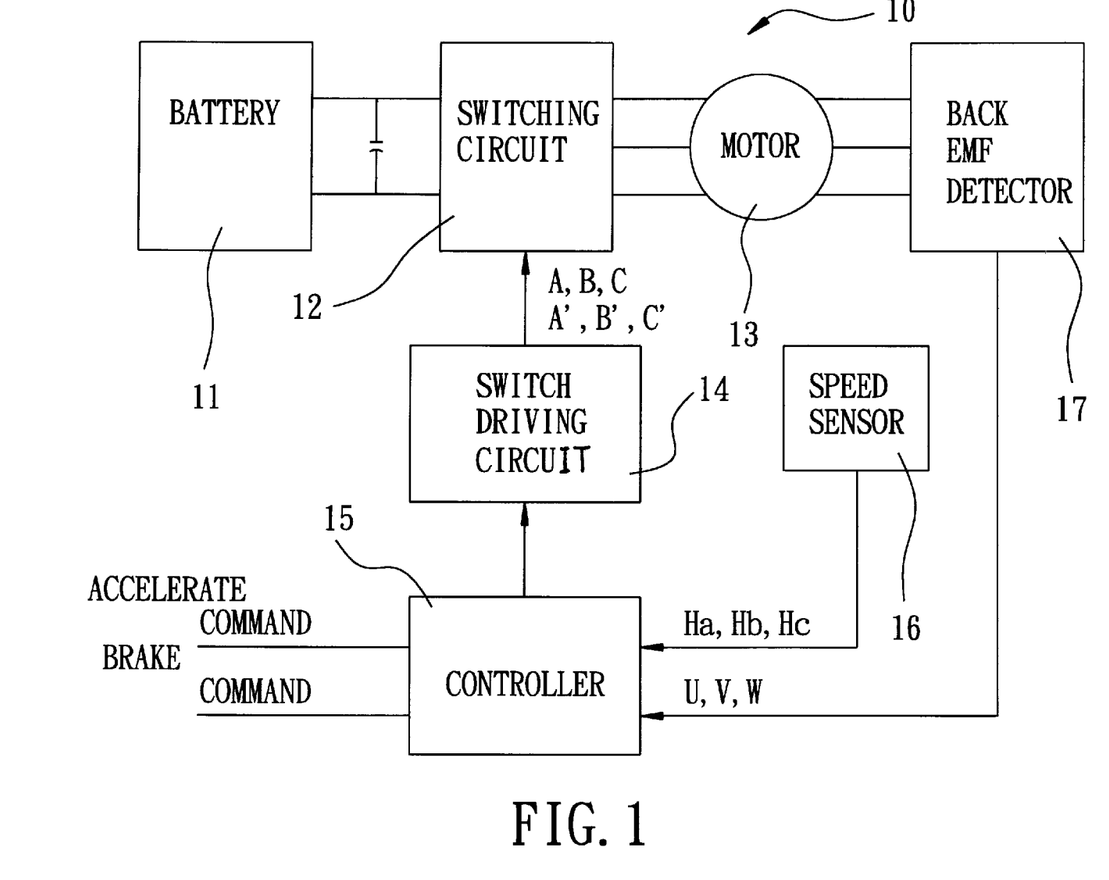
FIG. 1 is a schematic circuit block diagram illustrating a system that incorporates the preferred embodiment of a current control device according to this invention.

Referring to FIG. 1, there is shown a system 10, such as an electric motorcycle, that includes a rechargeable DC battery 11, a DC motor 13, a switching circuit 12 that interconnects the battery 11 and the motor 13, and a switch driving circuit 14 that is connected to the switching circuit 12. The switch driving circuit 14 is further connected to a controller 15. A speed sensor 16, such as magnetic pole sensors, is employed to detect the actual rotational speed of the motor 13, and generates motor commutation signals (Ha, Hb, Hc) that are received by the controller 15. A back electromotive force (EMF) detector 17 is connected to the motor 13 and the controller 15, and detects the actual magnitude of back EMF waves of the motor 13. An arrangement for detecting the back EMF waves of a motor can be found in U.S. Pat. No. 5,473,725, entitled "Method and Device For Controlling the Speed of the Brushless. DC Motor Provided for an Electric Vehicle."

Figure 2:
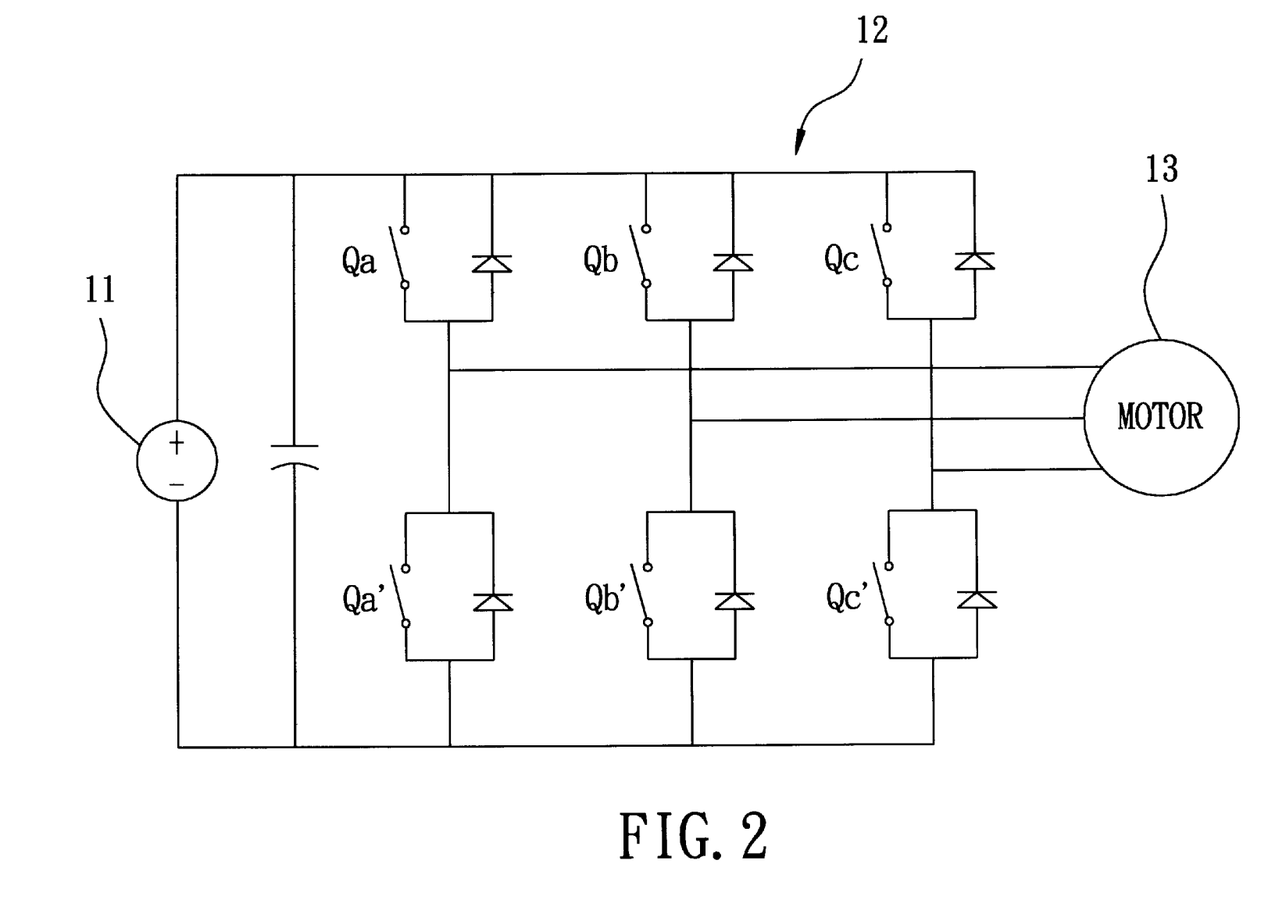
FIG. 2 is a schematic electrical circuit diagram illustrating a battery, a switching circuit and a motor of the system of FIG. 1.

As shown in FIG. 2, the switching circuit 12 includes a plurality of normally open control switches (QA, QB, QC, QA', QB', QC') that are connected to the battery 11 and to the coils (not shown) of the motor 13 in a known manner. Each of the control switches (QA, QB, QC, QA', QB', QC') has a diode connected across the same.

Figure 3:
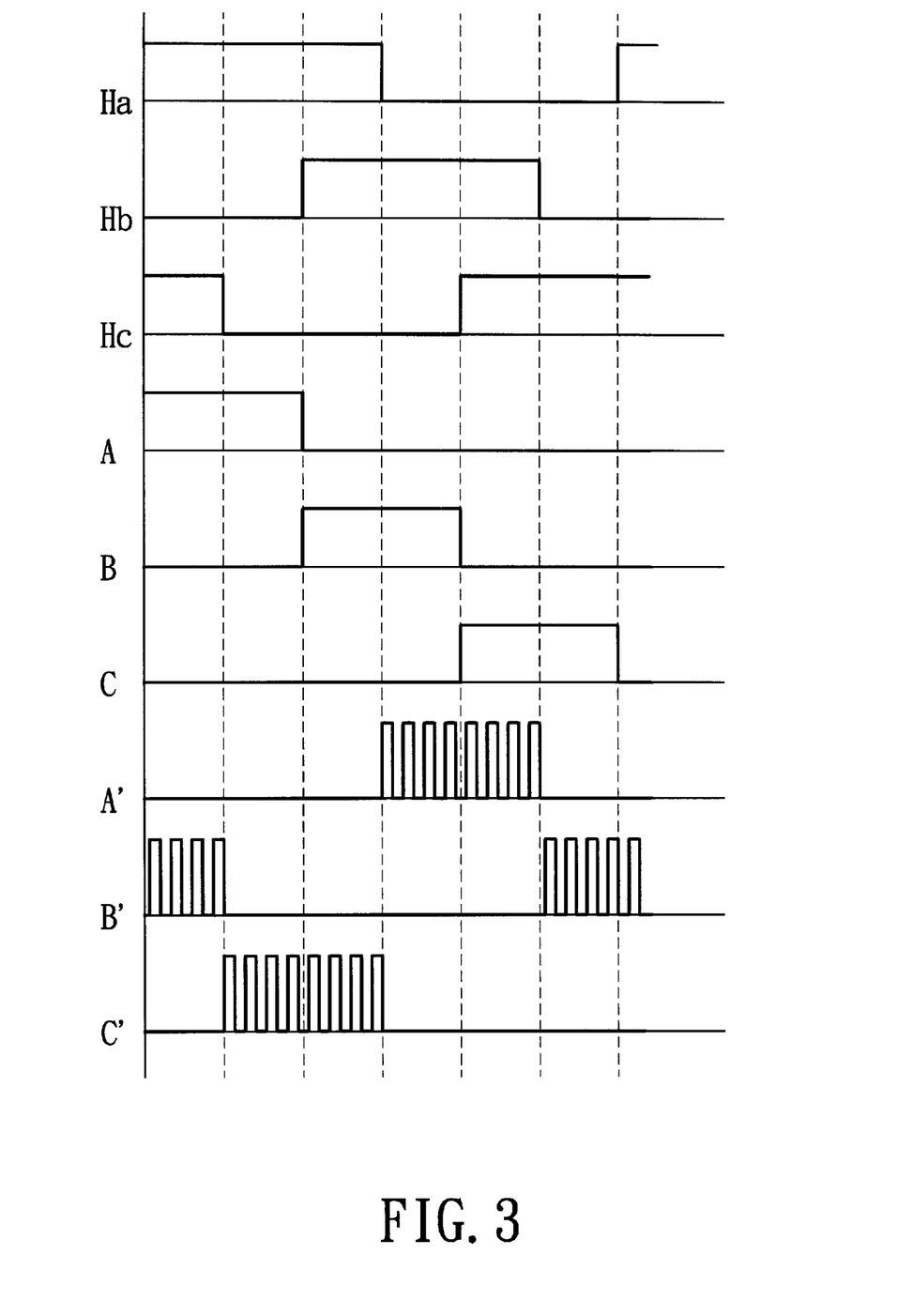
FIG. 3 is a timing diagram illustrating control pulses generated by a switch driving circuit to enable rotation of the motor in a positive direction and with a positive torque.

As is known in the art, in response to an accelerate command from a hand-operated throttle (not shown) of the system 10, the controller 15 enables the switch driving circuit 14 to generate a series of first control pulses (A, B, C) and a series of pulse-width-modulated second control pulses (A', B', C'), such as those shown in FIG. 3, which are synchronized with the motor commutation signals (Ha, Hb, Hc) from the speed sensor 16 and which are received by the control switches (QA, QB, QC, QA', QB', QC'), respectively. At this time, the motor 13 is configured so as to draw power from the battery 11, and rotates in a positive direction with a positive torque.

Figure 4:
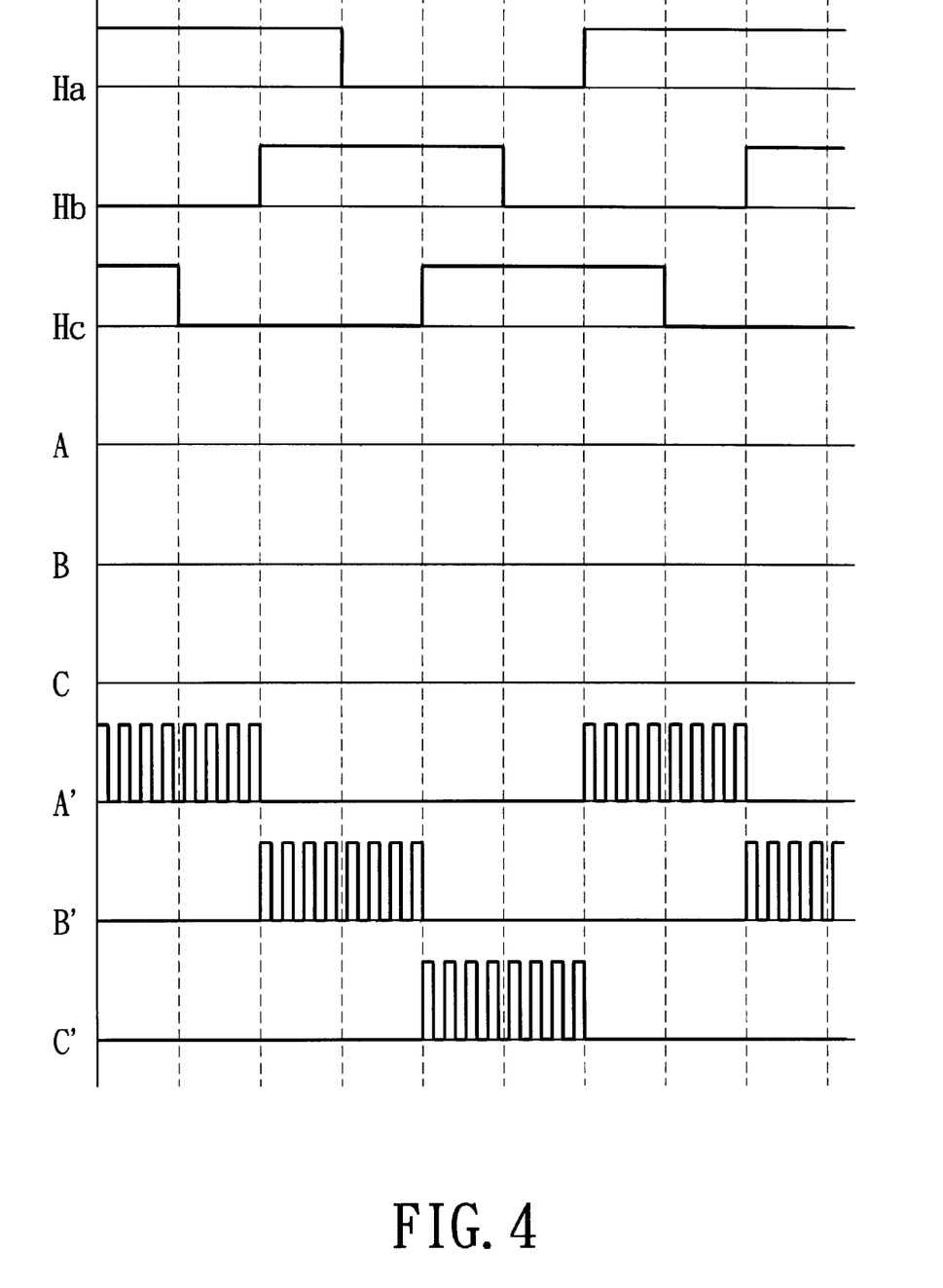
FIG. 4 is a timing diagram illustrating control pulses generated by a switch driving circuit to enable rotation of the motor in the positive direction and with a negative torque.

On the other hand, in response to a brake command from the hand-operated throttle (not shown) of the system 10, the controller 15 enables the switch driving circuit 14 to generate the pulse-width-modulated control pulses (A', B', C'), such as those shown in FIG. 4, which are synchronized with the motor commutation signals (Ha, Hb, Hc) from the speed sensor 16 and which are received by the control switches (QA', QB', QC'), respectively. At this time, the motor 13 is configured to operate as a generator for supplying power to the battery 11, and rotates in the positive direction but with a negative torque.

Figure 5:
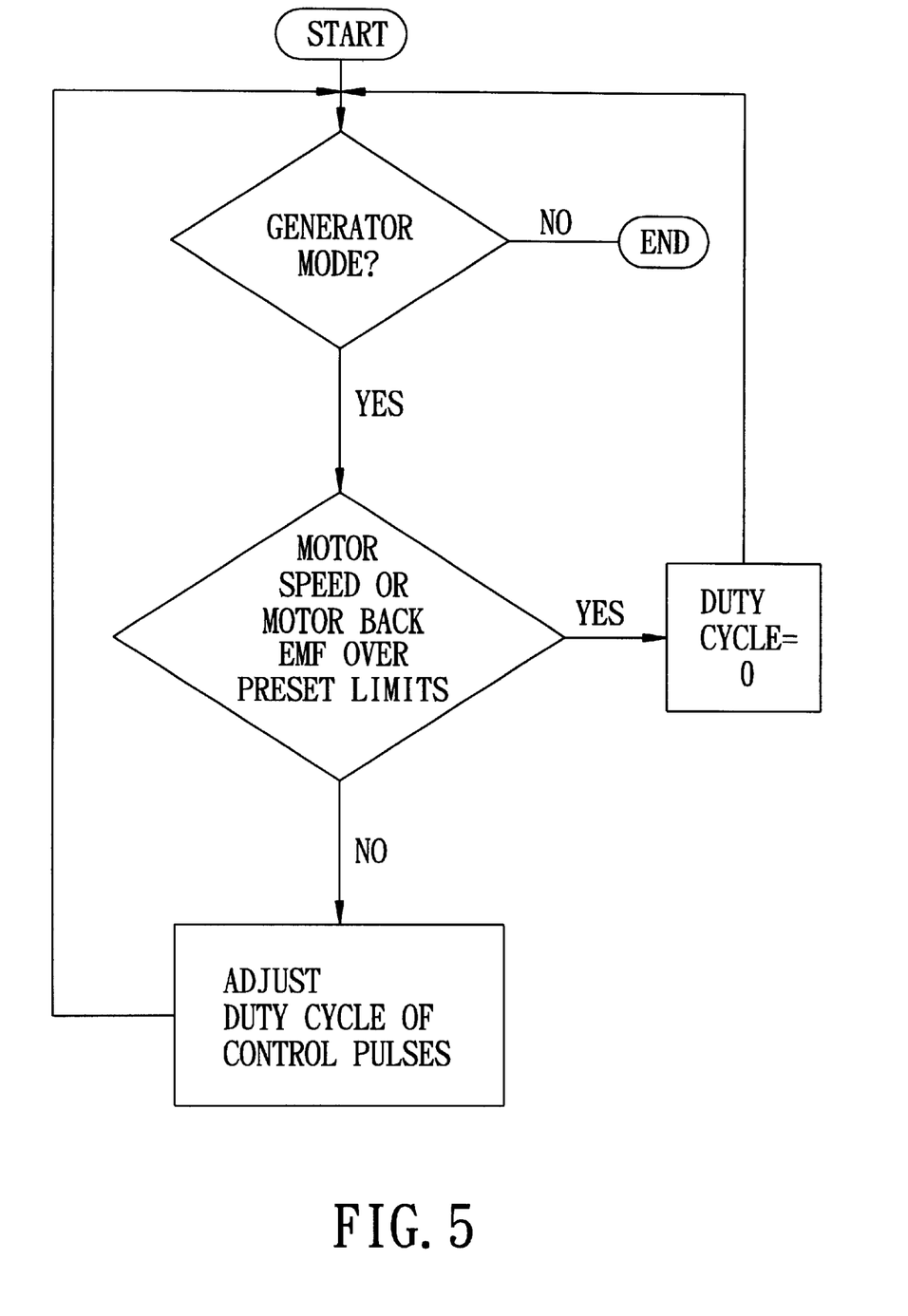
FIG. 5 is a flow chart illustrating the current control method of the preferred embodiment.

FIG. 5 is a flowchart to illustrate the current control method of the preferred embodiment. As shown, after determination by the controller 15 that the motor 13 is to be operated in the generator mode, the controller 15 determines from the motor commutation signals (Ha, Hb, Hc) of the speed sensor 16 or from the output (U, V, W) of the back EMF detector 17 if the actual rotational speed of the motor 13 is in excess of about 90% of the rated maximum speed of the motor 13 under no load condition, or if the actual magnitude of the back EMF waves of the motor 13 is in excess of about 90% of the rated maximum magnitude of the back EMF waves of the motor 13 under no load condition. If either of the preset limits was breached, the controller 15 controls the switch driving circuit 14 such that the control pulses (A', B', C') issued by the latter to the switching circuit 12 have 0% duty cycle. The control switches (QA', QB', QC') of the switching circuit 12 are thus in an open state, thereby terminating operation of the motor 13 in the generator mode to prevent large motor currents that can cause damage to the control switches (QA', QB', QC').

Figure 6:
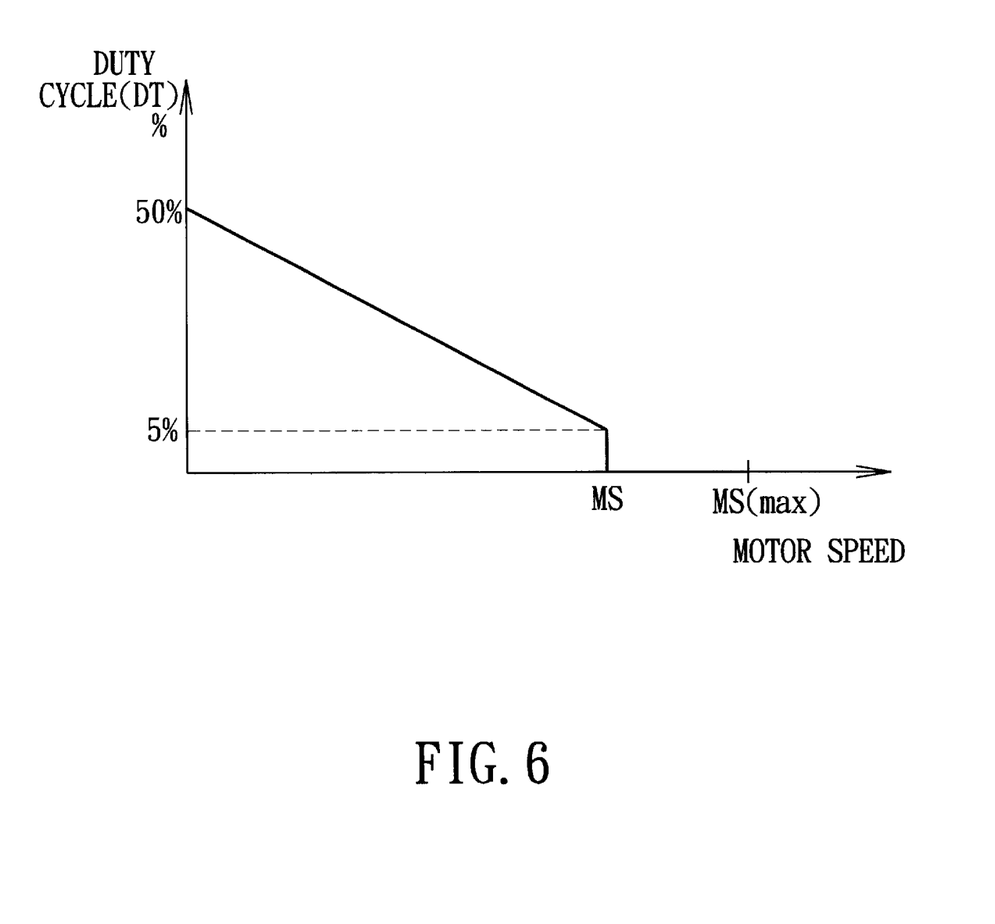
FIG. 6 is a plot illustrating how the duty cycle of the control pulses generated by the switch driving circuit is adjusted with respect to the actual rotational speed of the motor in the current control method of the preferred embodiment.

If the actual rotational speed of the motor 13 is less than 90% of the rated maximum speed of the motor 13 under no load condition, the controller 15 controls the switch driving circuit 14 to adjust the duty cycle of the pulse-width-modulated control pulses (A', B', C') issued by the latter to the switching circuit 12 in an inversely proportional linear relationship with respect to the actual rotational speed of the motor 13. FIG. 6 is a plot illustrating how the duty cycle (DT) of the control pulses (A', B', C') generated by the switch driving circuit 14 is adjusted with respect to the actual rotational speed of the motor 13 in the current control method of the preferred embodiment. The duty cycle (DT) has a maximum value of 50% when the actual rotational speed of the motor 13 is at a minimum (motor speed 0), and has a minimum value of about 5% when the actual rotational speed (MS) of the motor 13 is about 90% of the rated maximum speed ($MS_{(max)}$) of the motor 13 under no load condition. As such, based on the actual rotational speed of the motor 13, the controller 15 determines the new duty cycle (DT) of the control pulses (A', B', C') according to the relationship shown in FIG. 6, and controls the switch driving circuit 14 to adjust the duty cycle (DT) of the control pulses (A', B', C') accordingly.

Figure 7:
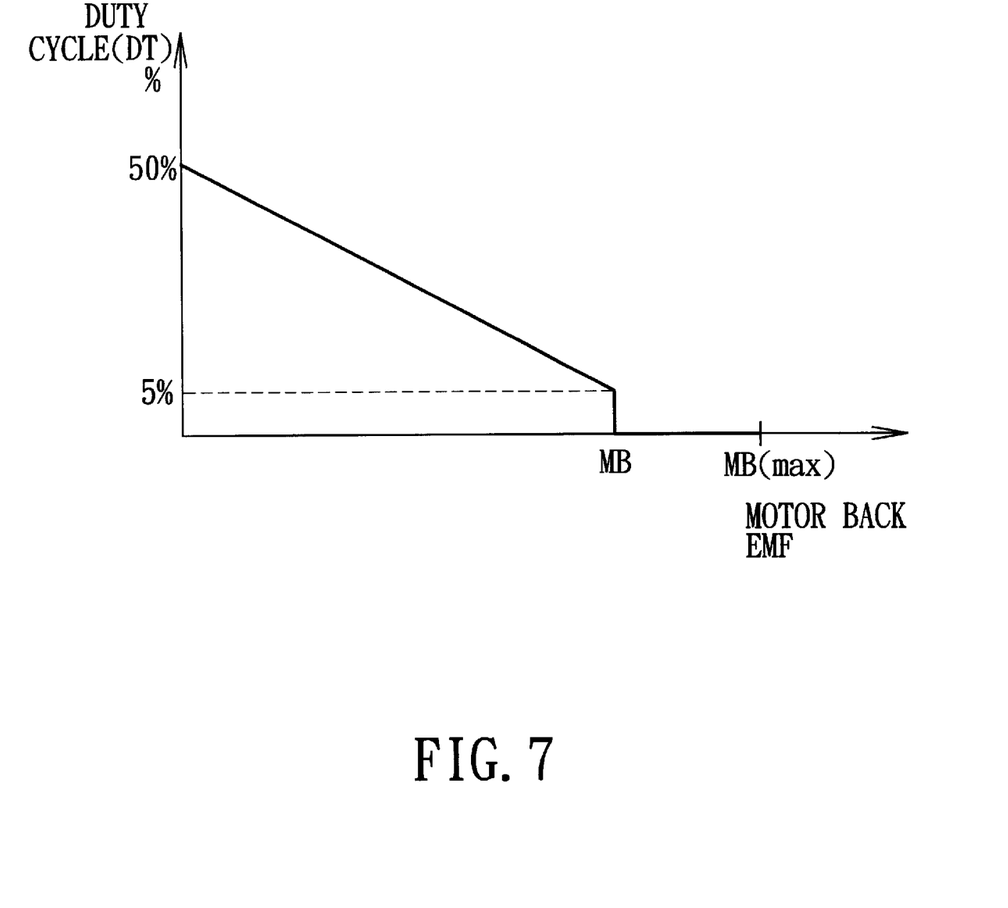
FIG. 7 is a plot illustrating how the duty cycle of the control pulses generated by the switch driving circuit is adjusted with respect to the actual magnitude of back electromotive force waves of the motor in the current control method of the preferred embodiment.

Alternatively, if the actual magnitude of the back EMF waves of the motor 13 is less than 90% of the rated maximum magnitude of the back EMF waves of the motor 13 under no load condition, the controller 15 controls the switch driving circuit 14 to adjust the duty cycle of the pulse-width-modulated control pulses (A', B', C') issued by the latter to the switching circuit 12 in an inversely proportional linear relationship with respect to the actual magnitude of the back EMF waves of the motor 13. FIG. 7 is a plot illustrating how the duty cycle (DT) of the control pulses (A', B', C') generated by the switch driving circuit 14 is adjusted with respect to the actual magnitude of the back EMF waves of the motor 13 in the current control method of the preferred embodiment. The duty cycle (DT) has a maximum value of 50% when the actual magnitude of the back EMF waves of the motor 13 is at a minimum (back EMF=0), and has a minimum value of about 5% when the actual magnitude of the back EMF waves (MB) of the motor 13 is about 90% of the rated maximum magnitude ($MB_{(max)}$) of the back EMF waves of the motor 13 under no load condition. As such, based on the actual magnitude of the back EMF waves of the motor 13, the controller 15 determines the new duty cycle (DT) of the control pulses (A', B', C') according to the relationship shown in FIG. 7, and controls the switch driving circuit 14 to adjust the duty cycle (DT) of the control pulses (A', B', C') accordingly.

It has thus been shown that, by controlling the duty cycle (DT) of the control pulses issued by the switch driving circuit 14 to the switching circuit 12 in the manner described hereinabove, large current flows through the switching circuit 12 can be avoided with the use of the current control method and device of this invention when the motor 13 operates in the generator mode to prevent damage to the control switches.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. In a system that includes a battery, a motor, a switching circuit that interconnects the battery and the motor, a switch driving circuit that is connected to the switching circuit, and a controller that is connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque, a method of controlling current flow to the motor when the switching circuit is operated in the second mode, comprising the steps of:
    detecting actual rotational speed of the motor; and
    controlling the switch driving circuit to adjust duty cycle of control pulses provided by the switch driving circuit to the switching circuit in an inversely proportional relationship with respect to the actual rotational speed of the motor, thereby controlling the current flow to the motor to prevent damage to the switching circuit.

2. The method of claim 1, wherein the duty cycle has a maximum value of 50% when the actual rotational speed of the motor is at a minimum, and has a minimum value of about 5% when the actual rotational speed of the motor is about 90% of the rated maximum speed of the motor under no load condition.

3. The method of claim 1, wherein the duty cycle is equal to 0% when the actual rotational speed of the motor is in excess of about 90% of the rated maximum speed of the motor under no load condition.

4. The method of claim 1, wherein the control pulses provided by the switch driving circuit to the switching circuit are pulse-width-modulated pulses that are synchronized with commutation signals of the motor.

5. In a system that includes a battery, a motor, a switching circuit that interconnects the battery and the motor, a switch driving circuit that is connected to the switching circuit, and a controller that is connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque, a method of controlling current flow to the motor when the switching circuit is operated in the second mode, comprising the steps of:
    detecting actual magnitude of back electromotive force waves of the motor; and
    controlling the switch driving circuit to adjust duty cycle of control pulses provided by the switch driving circuit to the switching circuit in an inversely proportional relationship with respect to the actual magnitude of the back electromotive force waves of the motor, thereby controlling the current flow to the motor to prevent damage to the switching circuit.

6. The method of claim 5, wherein the duty cycle has a maximum value of 50% when the actual magnitude of the back electromotive force waves of the motor is at a minimum, and has a minimum value of about 5% when the actual magnitude of the back electromotive force waves of the motor is about 90% of the rated maximum magnitude of the back electromotive force waves of the motor under no load condition.

7. The method of claim 5, wherein the duty cycle is equal to 0% when the actual magnitude of the back electromotive force waves of the motor is in excess of about 90% of the rated maximum magnitude of the back electromotive force waves of the motor under no load condition.

8. The method of claim 5, wherein the control pulses provided by the switch driving circuit to the switching circuit are pulse-width-modulated pulses that are synchronized with commutation signals of the motor.

9. In a system that includes a battery, a motor, a switching circuit that interconnects the battery and the motor, and a switch driving circuit that is connected to the switching circuit, a device for controlling current flow to the motor, comprising:
    a controller adapted to be connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque; and
    a speed sensor connected to said controller and adapted to detect actual rotational speed of the motor;
    said controller being adapted to control the switch driving circuit to adjust duty cycle of control pulses provided by the switch driving circuit to the switching circuit in an inversely proportional relationship with respect to the actual rotational speed of the motor when the switching circuit is operated in the second mode, thereby controlling the current flow to the motor to prevent damage to the switching circuit.

10. The device of claim 9, wherein the duty cycle has a maximum value of 50% when the actual rotational speed of the motor is at a minimum, and has a minimum value of about 5% when the actual rotational speed of the motor is about 90% of the rated maximum speed of the motor under no load condition.

11. The device of claim 9, wherein the duty cycle is equal to 0% when the actual rotational speed of the motor is in excess of about 90% of the rated maximum speed of the motor under no load condition.

12. The device of claim 9, the control pulses provided by the switch driving circuit to the switching circuit being pulse-width-modulated pulses, wherein said speed sensor generates commutation signals, and wherein said controller is adapted to further control the switch driving circuit to synchronize the control pulses with the commutation signals.

13. In a system that includes a battery, a motor, a switching circuit that interconnects the battery and the motor, and a switch driving circuit that is connected to the switching circuit, a device for controlling current flow to the motor, comprising:

a controller adapted to be connected to the switch driving circuit for controlling operation of the switching circuit in one of a first mode, wherein the motor is configured so as to draw power from the battery and wherein the motor rotates in a positive direction and with a positive torque, and a second mode, wherein the motor is configured so as to supply power to the battery and wherein the motor rotates in the positive direction and with a negative torque; and a back electromotive force detector connected to said controller and adapted to detect actual magnitude of back electromotive force waves of the motor;

said controller being adapted to control the switch driving circuit to adjust duty cycle of control pulses provided by the switch driving circuit to the switching circuit in an inversely proportional relationship with respect to the actual magnitude of the back electromotive force waves of the motor when the switching circuit is operated in the second mode, thereby controlling the current flow to the motor to prevent damage to the switching circuit.

14. The device of claim 13, wherein the duty cycle has a maximum value of 50% when the actual magnitude of the back electromotive force waves of the motor is at a minimum, and has a minimum value of about 5% when the actual magnitude of the back electromotive force waves of the motor is about 90% of the rated maximum magnitude of the back electromotive force waves of the motor under no load condition.

15. The device of claim 13, wherein the duty cycle is equal to 0% when the actual magnitude of the back electromotive force waves of the motor is in excess of about 90% of the rated maximum magnitude of the back electromotive force waves of the motor under no load condition.

16. The device of claim 13, the control pulses provided by the switch driving circuit to the switching circuit being pulse-width-modulated pulses, wherein said device further comprises a speed sensor connected to said controller and adapted to generate commutation signals in accordance with rotation of the motor, and wherein said controller is adapted to further control the switch driving circuit to synchronize the control pulses with the commutation signals.

* * * * *